US011775287B2

(12) United States Patent
Subramanian et al.

(10) Patent No.: US 11,775,287 B2
(45) Date of Patent: Oct. 3, 2023

(54) MANIFEST AND CONTENT DELIVERY

(71) Applicant: salesforce.com, inc., San Francisco, CA (US)

(72) Inventors: Sudha Subramanian, San Ramon, CA (US); Jeaneth A. Vergara, Granite Bay, CA (US)

(73) Assignee: Salesforce, Inc., San Francisco, CA (US)

( * ) Notice: Subject to any disclaimer, the term of this patent is extended or adjusted under 35 U.S.C. 154(b) by 289 days.

(21) Appl. No.: 16/743,956

(22) Filed: Jan. 15, 2020

(65) Prior Publication Data

US 2021/0216307 A1    Jul. 15, 2021

(51) Int. Cl.
*G06F 8/71* (2018.01)
*G06F 8/36* (2018.01)

(52) U.S. Cl.
CPC . *G06F 8/71* (2013.01); *G06F 8/36* (2013.01)

(58) Field of Classification Search
CPC ..................................... G06F 8/71; G06F 8/36
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Lewis A Bullock, Jr.
*Assistant Examiner* — Theodore E Hebert
(74) *Attorney, Agent, or Firm* — Dergosits & Noah LLP; Todd A. Noah

(57) ABSTRACT

A system receives one or more software artifacts for enabling a software version change requested for a production environment associated with at least one data center location. The system stores the one or more software artifacts in a memory location of a controlled-access production repository. The system receives a first authorization determination of the one or more software artifacts from an author-user account, the author-user account associated with a developer identity that created the one or more software artifacts. The system receives a second authorization determination of the one or more software artifacts from an additional-user account. Based on the first and second authorization determinations, the system determines whether to package the one or more software artifacts into a manifest for transmission to the at least one data center location.

17 Claims, 7 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 * | 6/2010 | Weissman ............ G06F 21/6227 717/171 |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,977,647 B2 * | 3/2015 | Viripaeff ............ G06F 16/24573 707/781 |
| 10,606,585 B1 * | 3/2020 | Safronoff ................ G06F 9/54 |
| 11,138,001 B2 * | 10/2021 | Cook .................... G06F 21/629 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086482 A1 * | 4/2008 | Weissman ............ G06F 21/6218 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0161931 A1 * | 6/2011 | Camelon ................ G06F 8/71 717/121 |
| 2012/0233137 A1 | 9/2012 | Jakobson et al. |
| 2013/0067449 A1 * | 3/2013 | Sannidhanam ............ G06F 8/60 717/170 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0238660 A1 * | 9/2013 | Viripaeff ............ G06F 21/6227 707/783 |
| 2014/0282353 A1 * | 9/2014 | Jubran ...................... G06F 8/00 717/101 |
| 2014/0282398 A1 * | 9/2014 | Podolyak .................. G06F 8/36 717/121 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2019/0235851 A1 * | 8/2019 | Vergara .................... G06F 21/64 |
| 2019/0354354 A1 * | 11/2019 | Dubinskii ............. G06F 11/301 |
| 2020/0004528 A1 * | 1/2020 | Pape ........................ G06F 8/71 |

* cited by examiner

MANIFEST AND CONTENT DELIVERY

TECHNICAL FIELD

The present disclosure relates generally to the software development version control platforms.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional software development version control platforms offer distributed version control and source code management functionalities. In such platforms, a pull request is a method of submitting a developer's contributions to a software development project hosted on a software development version control platform. A pull request occurs when a developer seeks to have their code committed to a repository for inclusion into a project's main repository after peer review. Once peer review authorizes the pull request, a merge occurs to commit the source code changes associated with the pull request to a master branch of the project's development. The developer's code is now committed to (or integrated into) the main code of the project which is the official working version of the project (i.e. the master branch). However, a merge conflict may occur when separate pull requests are for code that modifies the same region of a file and the platform is unable to discern which pull request should be committed to the master branch and which one shouldn't. In the case of a merge conflict, neither of the code from the pull requests will be committed until the merge conflict is resolved, most often by human intervention.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
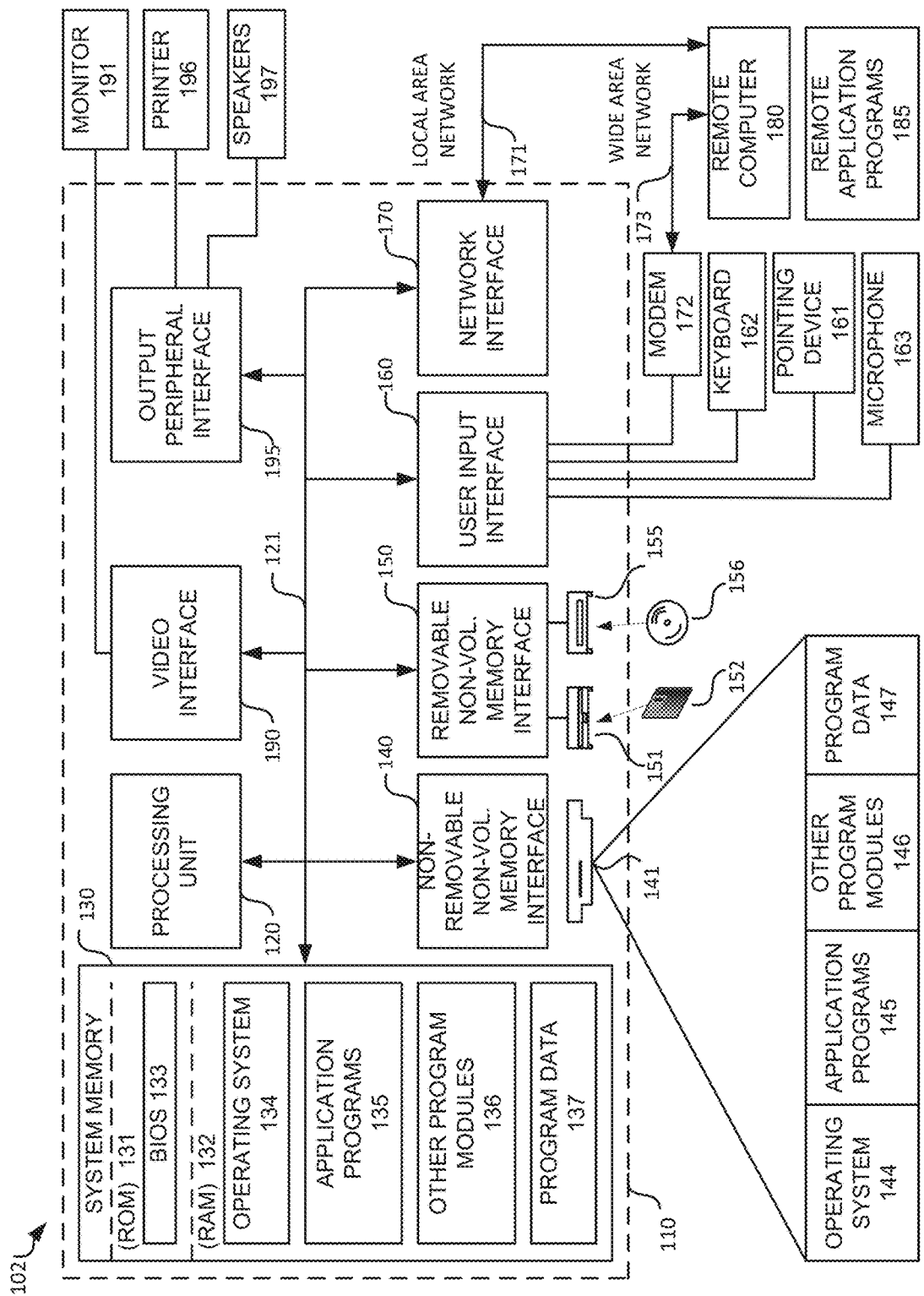
FIG. 1 shows a diagram of an example computing system that may be used with some embodiments.

Conventional software development version control platforms rely on a heavy manual process to handle a variety of events over the course of developing a project. For example, authorizing of manifest transmission to customers is an event that lacks a streamlined workflow in conventional systems. Typically, the handling of manifest transmission occurs on a per-pipeline basis. That is, each stage of a particular build pipeline runs on a build agent which runs the build process for that particular build pipeline. The build agent is then destroyed at the end of the particular build pipeline. Even if another build pipeline is using the same software artifacts already used in another build pipeline, then an entirely new build agent has to be implemented again. In addition, often a build pipeline may experience a failure condition, which requires the entire build pipeline and build agent to start over. The agent-per-pipeline approach and failover conditions of conventional platforms results in latency issues and lack the ability to handle manifest transmission requests sequentially.

In accordance with embodiments described herein, there are provided methods, systems and computer program products for a Manifest Manager. The Manifest Manager itself may further include one or more software modules for a crawler service, a pull request service, a packaging service, a promotion service and an intake service. In some embodiments, the Manifest Manager may implement a queue in order to serialize pull requests, provide reliable delivery of software artifacts and reliable master branch commits.

In some embodiments, when a request for a software change is received, the Manifest Manager enqueues a corresponding pull request before sending a response to the source of the requested software change. The Manifest Manager may publish an enqueue event and post a pr_queued (pull request queued) message based on the received request. The Manifest Manager's crawler service may periodically scan the queue to look for any missed pull requests or missed commits to master branch. The Manifest Manager may retrigger any missed pull requests or missed commits. In some embodiments, the crawler functionality may be a stateless service.

The Manifest Manager provides a delivery path for manifests, RPM (Red Hat Package Member) files, RPS (remote programming software) packages, docker images built by CI (Continuous Integration), 3PP (third party purchasing) certified $3^{rd}$ party images in any format and configuration data from research & development computing environment(s) to a data center production environment(s) and the public cloud. The Manifest Manager provides for a robust microservices-based delivery platform running on, for example, the Kubernetes open source application deployment system. The Manifest Manager improves the failures of conventional systems by reducing end-to-end latency for manifests and providing a better user experience for software developers.

According to an embodiment, the Manifest Manager receives one or more software artifacts for enabling a software version change requested for a production environment associated with at least one data center location. The Manifest Manager stores the one or more software artifacts in a memory location of a controlled-access production repository. The Manifest Manager receives a first authorization determination of the one or more software artifacts from an author-user account, the author-user account associated with a developer identity that created source code associated with the one or more software artifacts. The Manifest Manager receives a second authorization determination of the one or more software artifacts from an additional-user account. Based on the first and second authorization determinations, the Manifest Manager determines whether to package the one or more software artifacts into a manifest for transmission to the at least one data center location.

In some embodiments, a software artifact(s) may accompany a developer's source code and is a by-product of the software development process. A software artifact(s) may include project source code, identification of module dependencies in the project source code, binary files, and indications of resource constraints. In some embodiments, a manifest may be a file(s) that includes metadata related to source code. For example, a manifest may include a list of files meant for delivery to particular recipient as well as configuration data needed by the particular recipient to fully implement the related source code. In some embodiments, a manifest may include one or more software artifacts or include a list of software artifacts.

While one or more implementations and techniques are described herein as implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
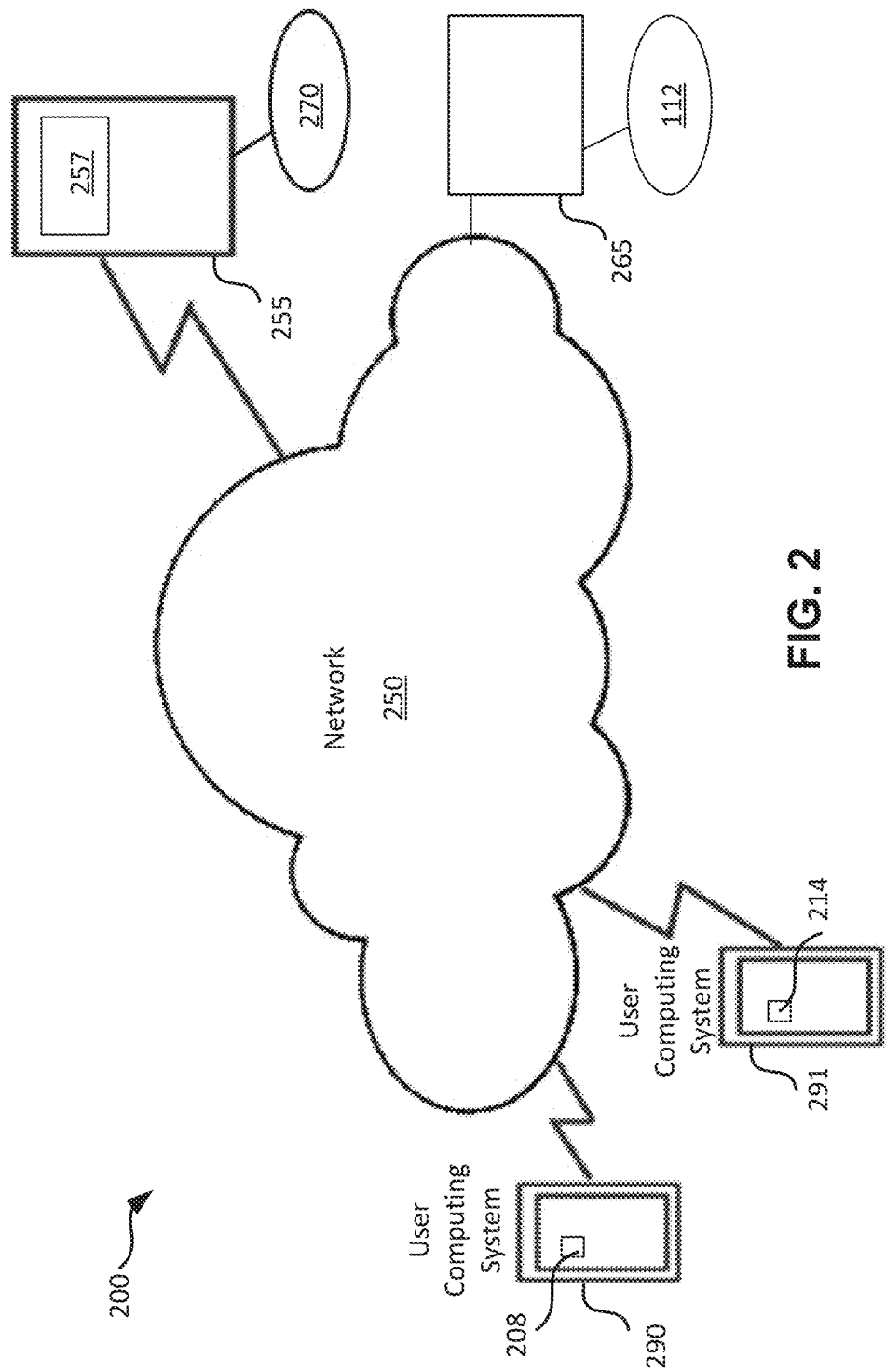
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 265 via the network 250.

Each of the computing systems 290 and 291 may include an application module such as module 208 or 214. For example, a user (e.g., a developer) may use the computing system 290 and the application module 208 to connect to and communicate with the server computing system 255 and log into application 257 (e.g., a Salesforce.com® application).

For some embodiments, the user may use the application 257 to develop, manage, install and execute a software package(s) for pausing and resuming virtual environments and one or more of pre-processing and post-processing customized codes related to development, management, installation and execution of the software package(s). The pre-processing and post-processing customized codes may be executed by the server computing system 255. The development, management, installation and execution (or portions thereof) may be executed by the server computing system 265 associated with the server computing system 255. The server 265 may be associated with database 112. For example, the server computing system 265 may be configured to develop, manage, install and execute a software package(s) using a product of Salesforce.com.

Figure 3:
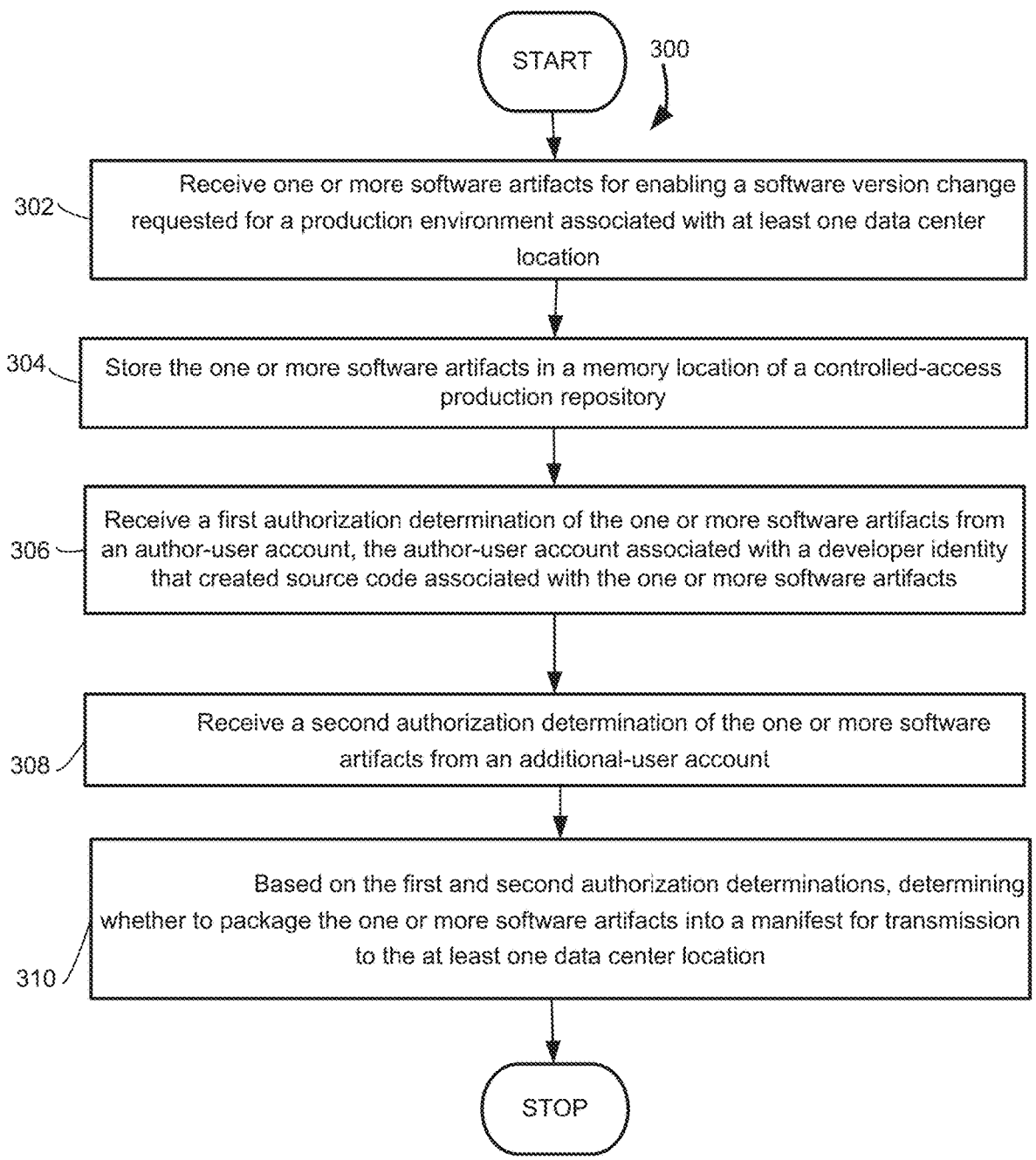
FIG. 3 is an operational flow diagram illustrating a high-level overview of a method for determining whether to package a manifest, in an embodiment.

FIG. 3 is an operational flow diagram illustrating a high-level overview of a method for determining whether to package a manifest, in an embodiment.

As shown in FIG. 3, at step 302 of method 300, the Manifest Manager receives one or more software artifacts for enabling a software version change requested for a production environment associated with at least one data center location. For example, the Manifest Manager's data flow may begin based on when a developer authors source code that has a related software artifact(s). In some embodiments, the developer-author wrote the source code in response to a $3^{rd}$-party data center location(s) request for a software change to be applied to a production environment of the requesting data center location.

At step 304, the Manifest Manager stores the one or more software artifacts in a memory location of a controlled-access production repository. For example, a pull request from the developer-author triggers the Manifest Manager to load the software artifact(s) into a controlled-access production repository, such as a specific directory(s) or folder(s) in the production repository.

At step 306, the Manifest Manager receives a first authorization determination of the one or more software artifacts from an author-user account (i.e. the developer-author) and receives a second authorization determination of the one or more software artifacts from an additional-user account (step 308). The author-user account and additional-user accounts may identify different software developers working on the same software development project.

At step 310, based on the first and second authorization determinations, the Manifest Manager determines whether to package the one or more software artifacts into a manifest for transmission to the at least one data center location. The Manifest Manager thereby manages and responds to user account activity representing a two-human authorization data flow for validating the software artifact(s) for source code developed in response to requested software version updates. In one embodiment, if the Manifest Manager determines that there are two approvals, the Manifest Manager packages a manifest as a .zip file to be sent to the data center location that is the source of the request for a software change.

Figure 4:
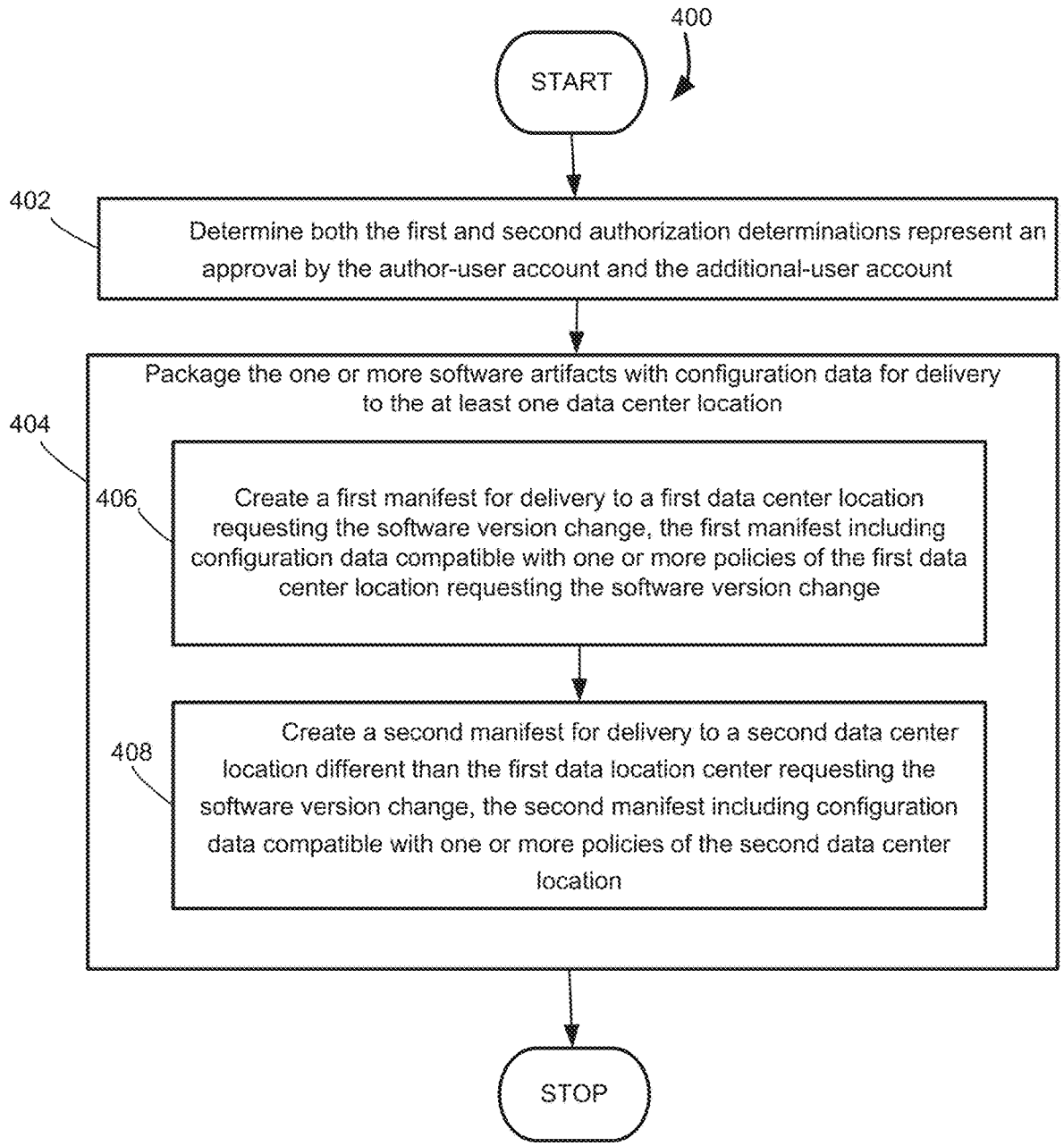
FIG. 4 is an operational flow diagram illustrating a high-level overview of a method for creating multiple manifests, in an embodiment.

FIG. 4 is an operational flow diagram illustrating a high-level overview of a method for creating multiple manifests, in an embodiment.

As shown in FIG. 4, at step 402 of method 400, the Manifest Manager determines both the first and second authorization determinations represent an approval by the author-user account and the additional-user account. For example, the Manifest Manager determines that user account activity represents a two-human authorization data flow indicating that a software artifact(s) related to a requested software change has been approved by user accounts that belong to a same software development project. In some embodiments, the user accounts that belong to the same software development project may be user accounts of a multi-tenant database system that includes a software development version control platform that implements the Manifest Manager.

At step 404, the Manifest Manager packages the one or more software artifacts with configuration data for delivery to the at least one data center location. For example, the Manifest Manager identifies first configuration data compatible with the production environment and policies implemented at the requesting data center location. The Manifest Manager builds a first .zip manifest file based on the approved software artifact(s) and the first configuration data and transmits the first .zip manifest file to the requesting data center location (step 406).

In addition, the Manifest Manager may also push out the approved software artifact(s) to other customer data center locations as well, thereby avoiding a whole new build pipeline. For example, the Manifest Manager identifies second configuration data compatible with the production environment and policies implemented at a data center location that is different than the requesting data center location. The Manifest Manager builds a second .zip manifest file based on the approved software artifact(s) and the second configuration data. The Manifest Manager transmits the second .zip manifest file to the different data center location (step 408).

Figure 5:
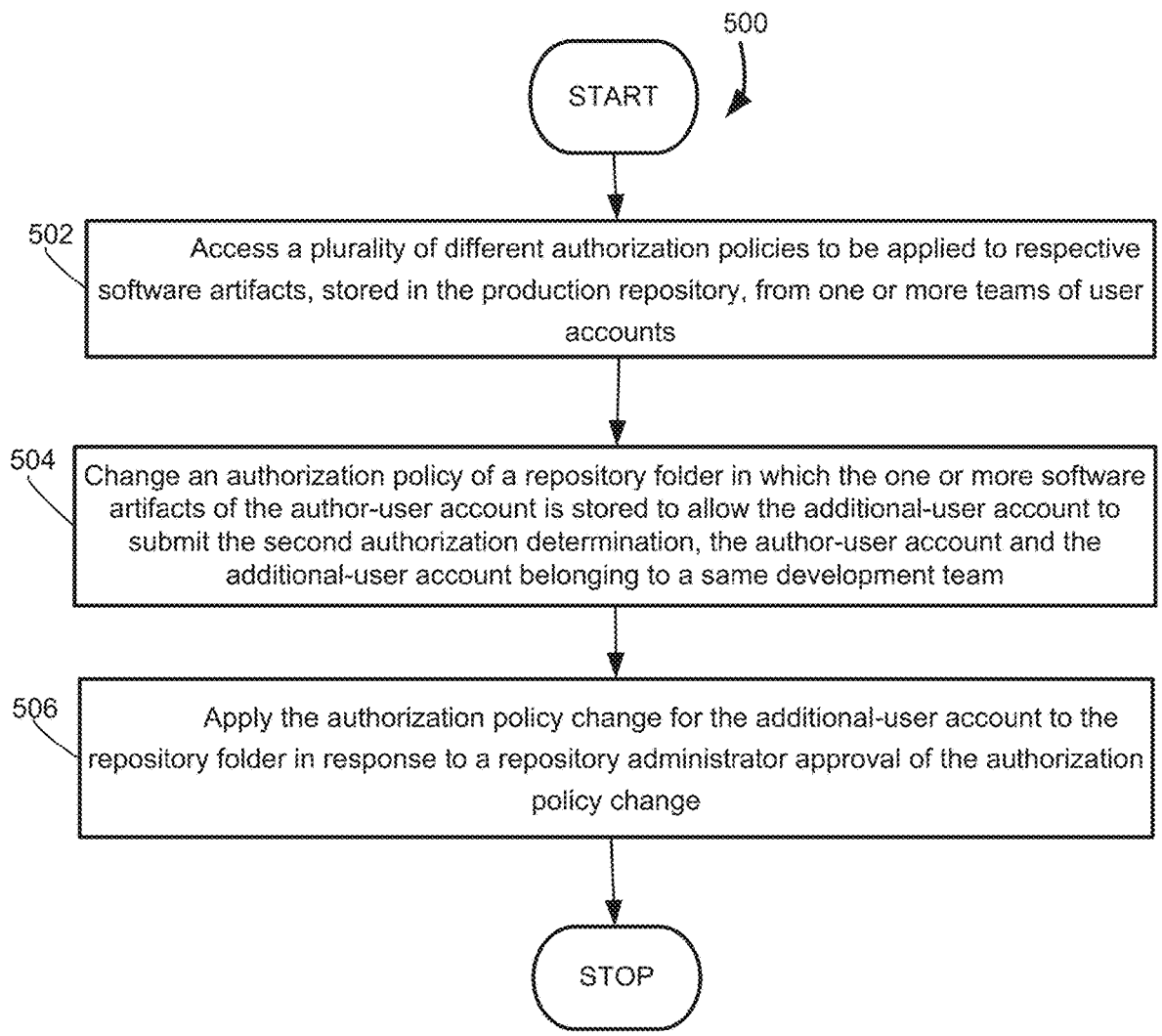
FIG. 5 is an operational flow diagram illustrating a high-level overview of a method for changing an authorization policy for a repository folder, in an embodiment.

FIG. 5 is an operational flow diagram illustrating a high-level overview of a method for changing an authorization policy for a repository folder, in an embodiment.

As shown in FIG. 5, at step 502 of method 500, the Manifest Manager accesses a plurality of different authorization policies to be applied to respective software artifacts, stored in the production repository, from one or more teams of user accounts. For example, a developer-author may belong to a team of developers whereby each developer team member may have different permission levels as to accessing the team's specific directory(s)/folder(s). Various developer team members may also have different write access authorization levels for modifying content loaded onto the team's specific directory(s)/folder(s). A team authorization policy for approving a software artifact(s) may be based on the permission levels and write access authorization levels of a subset of team members, such that some of the developer team members may have permission to submit an authorization for content while other developer team members may not. It is understood that the controlled-access production repository may have multiple directory(s)/folder(s) supporting other software development teams and each software development team may have its own various different level of permissions, write access authorizations levels and different overall authorization policies.

At step 504, the Manifest Manager changes an authorization policy of a repository folder in which the one or more software artifacts of the author-user account is stored to allow the additional-user account to submit the second authorization determination, the author-user account and the additional-user account belonging to a same development team. For example, the Manifest Manage provides functionality for updating, modifying and changing the authorization policy of a software development team to effect the two-human authorization data flow of the Manifest Manager, as described herein.

At step 506, the Manifest Manager applies the authorization policy change for the additional-user account to the repository folder in response to a repository administrator approval of the authorization policy change. In embodiment, the Manifest Manager may trigger a change of an authorization policy in response to receiving approval of the authorization policy change from a user account for an administrator identity associated with a multi-tenant database system.

In one embodiment, the Manifest Manager receives a submitted approval based on selection of an approval functionality by an additional-user account having write access to a production repository into which an author-user account has loaded a software change and associated software artifact(s). The Manifest Manager applies the authorization policy of a software development team that includes of the author-user account and the additional-user account. In some embodiments, the approval submission from the additional-user account is detected by the Manifest Manager as an approval comment due to the additional-user account not having write access to the production repository according to the authorization policy.

In one embodiment, the Manifest Manager generates a fail status of first and second authorization determinations from the author-user account and the additional-user account based on detecting an error in the software artifact(s) and/or determining the author-user account lacks access privileges for generating the approval submission in accordance with the authorization policy of a software development team (or in accordance with a recent update to the authorization policy of a software development team).

In some embodiments, a $3^{rd}$-party customer may raise a pull request with regard to a docker image(s) in their own service repository. A $3^{rd}$-party author may complete the build for the docker image(s), which may then be approved by another user account who is a collaborator with the $3^{rd}$-party author and has access permission to the service repository. Based on approval by the collaborator, build changes to the docker image may merge onto the master branch. The Manifest Manager detects the merge and acquires the coordinates of the docker image and confirms that the pull request that was merged to the master branch was approved by two accounts. Upon determining the proper approval, the Manifest Manager promotes the docker image to a production repository, from which the docker image may be included for transmission in a manifest.

According to some embodiments, an intake service module ("intake service") of the Manifest Manager sends received pull requests messages to an exchange ("delivery_exchange") with a routing key having a form of: <repo name>.<request type>. The "repo name" portion of the routing key may be a repository name (such "sam/manifest"), the "request type" portion of the routing key may identify the action that needs to be take (such as a pull request).

The intake service acts a publisher functionality of the Manifest Manager and creates the delivery_exchange upon being initialized. From the delivery_exchange, messages may be routed to multiple delivery queues ("sam," "manifest," "gater"). The respective queues may bind to the delivery_exchange bay way of a corresponding appropriate routing key ("manifest.pr," "sam.pr," "hmd.pr") to indicate a message type for each respective queue.

In some embodiments, the respective queues may each have a durable option and may be owned by consumers. In order to provide the serialization advantages of the Manifest Manager, there will be a pull request consumer active per delivery queue. Pull requests are thereby queued until consumed by the Manifest Manager's pull request service. Each pull request consumer processes one pull request at a time and the Manifest Manager receives consumer acknowledgement when the pull request is successful. Any unacknowledged pull request stays in or is returned to its respective queue.

In another embodiment, for a promotion service module ("promotion service") of the Manifest Manager, a pull request may be represented by an update to or a creation of a corresponding "manifest.yaml" file. The promotion service may check a config.yaml file to determine whether a customer product associated with a respective pull request is enabled for auto-promotion. If auto-promotion is enabled, the promotion service may auto-authenticate the respective pull request by way of a user account present in an "acl.yaml" file (access control list) for the customer product.

In some embodiments, the intake service may send master repository message to the delivery_exchange. The intake service sends the master repo messages to the delivery_exchange with a routing key of the form <repo name>.<request type>. For example, the first portion of a routing key for the master repository message may be a repository name ("sam," "manifest," "gater"), and the second portion may identify the action that needs to be taken ("package"). From delivery_exchange, the master repository message may be routed by a package service module ("package service") of the Manifest Manager to other respective queues ("sam_package," "manifest_package"). The other respective queues will bind to the delivery_exchange with the appropriate routing key ("manifest.package," "sam.package", "gater.package") to express the kind of master repository message a queue should receive.

In the Manifest Manager, if a master branch request is processed successfully, it will be removed from the respective queue into which it was placed. A packaging failure will be treated by the package service to be an application failure. In some embodiments, the Manifest Manager may further implement sidecar containers in order to run a build container inside of a pull request of the packaging service. Sidecar containers provide the isolation required for build containers at the pod level, where a "pod" may be defined as a basic execution unit, in an object model on an application that can be created and deployed. The Manifest Manager ensures its services and the build containers do not share graph storage. To avoid slower build cycles since docker images cannot be reused across builds, the Manifest Manager empties a "Dir" volume or "CephFS" volume for building a sidecar container for docker images. In addition respective service containers (for Manifest Manager services) and a sidecar container may share data using a "emptyDir" volume.

System Overview

Figure 6:
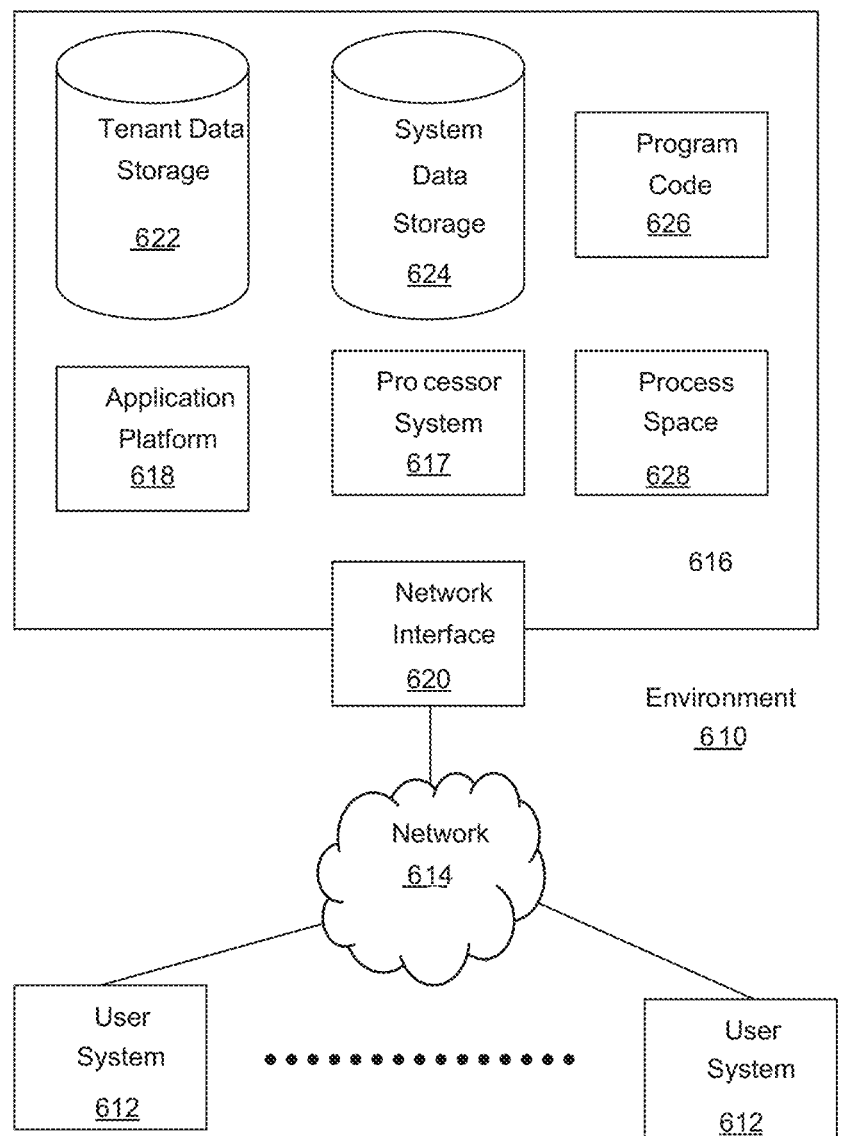

FIG. 6 illustrates a block diagram of an environment 610 wherein an on-demand database service might be used. The environment 610 may include user system(s) 612, a network 614, a system 616, a processor system 617, an application platform 618, a network interface 620, a tenant data storage 622, a system data storage 624, program code 626, and a process space 628. In other embodiments, the environment 610 may not have all of the components listed and/or may have other elements instead of, or in addition to, those listed above.

The environment 610 is an environment in which an on-demand database service exists. A user system 612 may be any machine or system that is used by a user to access a database user system. For example, any of the user systems 612 may be a handheld computing device, a mobile phone, a laptop computer, a work station, and/or a network of computing devices. As illustrated in FIG. 6 (and in more detail in FIG. 7) the user systems 612 might interact via the network 614 with an on-demand database service, which is the system 616.

An on-demand database service, such as the system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 616" and the "system 616" will be used interchangeably herein. A database image may include one or more database objects. A relational database management system (RDMS) or the equivalent may execute storage and retrieval of information against the database object(s). The application platform 618 may be a framework that allows the applications of the system 616 to run, such as the hardware and/or software, e.g., the operating system. In an embodiment, the on-demand database service 616 may include the application platform 618 which enables creation, managing and executing one or more applications developed by the provider of the on-demand database service, users accessing the on-demand database service via user systems 612, or third-party application developers accessing the on-demand database service via the user systems 612.

The users of the user systems 612 may differ in their respective capacities, and the capacity of a particular user system 612 might be entirely determined by permissions (permission levels) for the current user. For example, where a salesperson is using a particular user system 612 to interact with the system 616, that user system 612 has the capacities allotted to that salesperson. However, while an administrator is using that user system 612 to interact with the system 616, that user system 612 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 614 is any network or combination of networks of devices that communicate with one another. For example, the network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 612 might communicate with the system 616 using TCP/IP and, at a higher network level, use other common Internet protocols to communicate, such as HTTP, FTP, AFS, WAP, etc. In an example where HTTP is used, the user systems 612 might include an HTTP client commonly referred to as a "browser" for sending and receiving HTTP messages to and from an HTTP server at the system 616. Such an HTTP server might be implemented as the sole network interface between the system 616 and the network 614, but other techniques might be used as well or instead. In some implementations, the interface between the system 616 and the network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 616, shown in FIG. 6, implements a web-based customer relationship management (CRM) system. For example, in one embodiment, the system 616 includes application servers configured to implement and execute CRM software applications as well as provide related data, code, forms, webpages and other information to and from the user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 616 implements applications other than, or in addition to, a CRM application. For example, the system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of the system 616 is shown in FIG. 6, including the network interface 620, the application platform 618, the tenant data storage 622 for tenant data 623, the system data storage 624 for system data 625 accessible to the system 616 and possibly multiple tenants, the program code 626 for implementing various functions of the system 616, and the process space 628 for executing MTS system processes and tenant-specific processes, such as running applications as part of an application hosting service. Additional processes that may execute on the system 616 include database indexing processes.

Several elements in the system shown in FIG. 6 include conventional, well-known elements that are explained only briefly here. For example, each of the user systems 612 could include a desktop personal computer, workstation, laptop, PDA, cell phone, or any wireless access protocol (WAP) enabled device or any other computing device capable of interfacing directly or indirectly to the Internet or other network connection. Each of the user systems 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 612 to access, process and view information, pages and applications available to it from the system 616 over the network 614. Each of the user systems 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 616 or other systems or servers. For example, the user interface device may be used to access data and applications hosted by the system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 612 and all of its components are operator configurable using applications, such as a browser, including computer code run using a central processing unit such as an Intel Pentium® processor or the like. Similarly, the system 616 (and additional instances of an MTS, where more than one is present) and all of their components might be operator configurable using application(s) including computer code to run using a central processing unit such as the processor system 617, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 616 is configured to provide webpages, forms, applications, data and media content to the user (client) systems 612 to support the access by the user systems 612 as tenants of the system 616. As such, the system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 7:
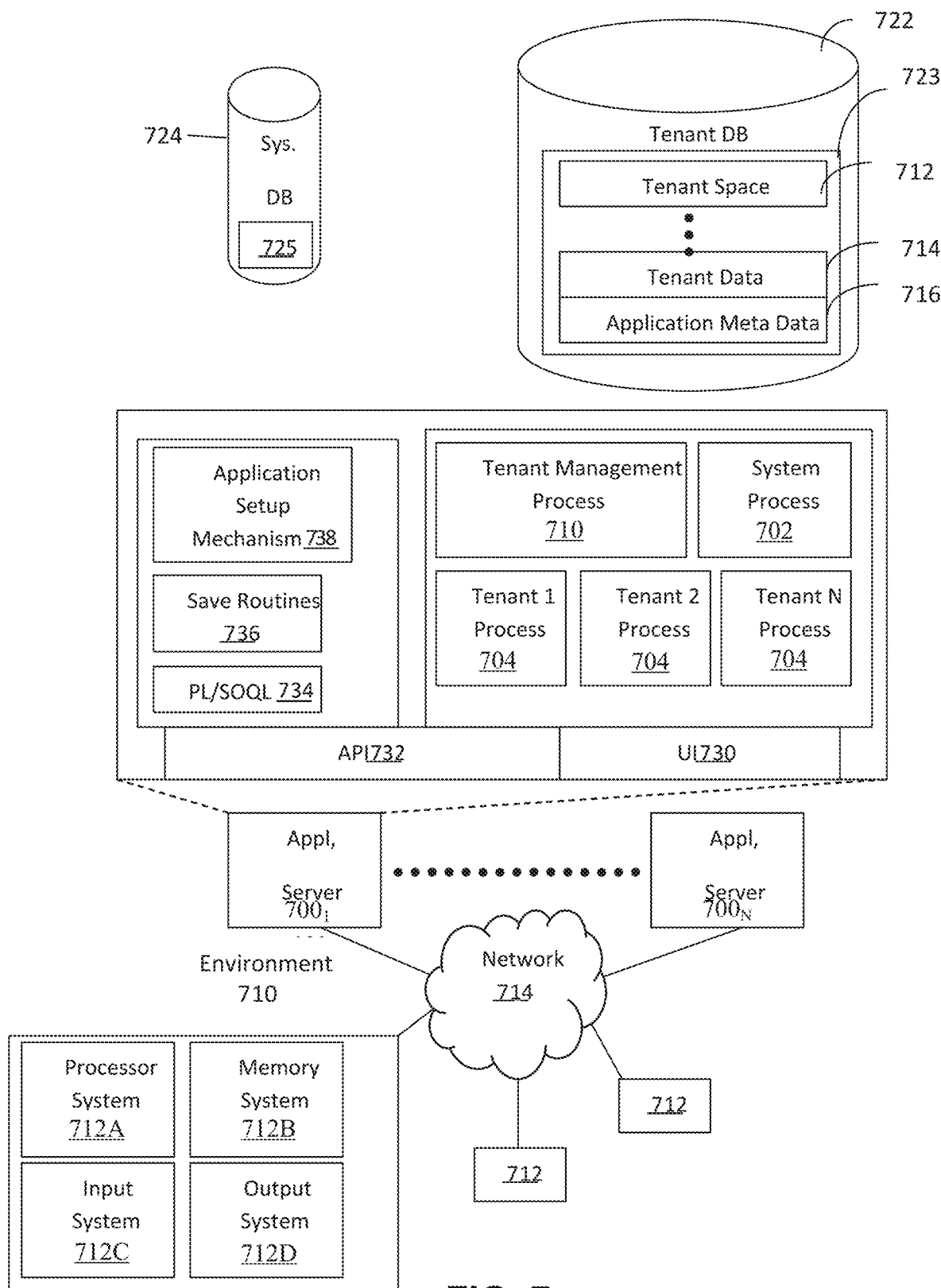
FIG. 7 illustrates a block diagram of an embodiment of elements of FIG. 6 and various possible interconnections between these elements.

FIG. 7 also illustrates the environment 710. However, in FIG. 7 elements of the system 616 and various interconnections in an embodiment are further illustrated. FIG. 7 shows that the each of the user systems 712 may include a processor system 712A, a memory system 712B, an input system 712C, and an output system 712D. FIG. 7 shows the network 714 and also shows that the system 616 may include the tenant data storage 722, the tenant data 723, the system data storage 724, the system data 725, a User Interface (UI) 730, an Application Program Interface (API) 732, a PL/SOQL 734, save routines 736, an application setup mechanism 738, applications servers $700_1$-$700_N$, a system process space 702, tenant process spaces 704, a tenant management process space 710, a tenant storage area 712, a user storage (or tenant data) 714, and application metadata 716. In other embodiments, the environment 710 may not have the same elements as those listed above and/or may have other elements instead of, or in addition to, those listed above.

The user systems 612, the network 614, the system 616, the tenant data storage 622, and the system data storage 624 were discussed above in FIG. 6. Regarding the user systems 712, the processor system 712A may be any combination of one or more processors. The memory system 712B may be any combination of one or more memory devices, short term, and/or long-term memory. The input system 712C may be any combination of input devices, such as one or more keyboards, mice, trackballs, scanners, cameras, and/or interfaces to networks. The output system 712D may be any combination of output devices, such as one or more monitors, printers, and/or interfaces to networks. As shown by FIG. 6, the system 616 may include the network interface 620 implemented as a set of HTTP application servers 700, the application platform 618, the tenant data storage 622, and the system data storage 624. Also shown is the system process space 702, including individual tenant process spaces 704 and the tenant management process space 710. Each application server 700 may be configured to access tenant data storage 622 and the tenant data 723 therein, and the system data storage 624 and the system data 725 therein to serve requests of the user systems 612. The tenant data 723 might be divided into individual tenant storage areas 712, which may be either a physical arrangement and/or a logical arrangement of data. Within each tenant storage area 712, the user storage 714 and the application metadata 716 might be similarly allocated for each user. For example, a copy of a user's most recently used (MRU) items might be stored to the user storage 714. Similarly, a copy of MRU items for an entire organization that is a tenant might be stored to the tenant storage area 712. The UI 730 provides a user interface and the API 732 provides an application programmer interface to the system 616 resident processes to users and/or developers at the user systems 612. The tenant data and the system data may be stored in various databases, such as one or more Oracle™ databases.

The application platform 618 includes the application setup mechanism 738 that supports application developers' creation and management of applications, which may be saved as metadata into the tenant data storage 622 by the save routines 736 for execution by subscribers as one or more tenant process spaces 704 managed by the tenant management process 710 for example. Invocations to such applications may be coded using the PL/SOQL 734 that provides a programming language style interface extension to the API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 716 for the subscriber making the invocation and executing the metadata as an application in a virtual machine.

Each application server 700 may be communicably coupled to database systems, e.g., having access to the system data 725 and the tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also may be used. For example, in certain embodiments, three consecutive requests from the same user could hit three different application servers 700, and three requests from different users could hit the same application server 700. In this manner, the system 616 is multi-tenant, wherein the system 616 handles storage of, and access to, different objects, data and applications across disparate users and organizations.

As an example of storage, one tenant might be a company that employs a sales force where each salesperson uses the system 616 to manage their sales process. Thus, a user might maintain contact data, leads data, customer follow-up data, performance data, goals and progress data, etc., all applicable to that user's personal sales process (e.g., in the tenant data storage 622). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 616 might also maintain system level data usable by multiple tenants or other data. Such system level data might include industry reports, news, postings, and the like that are sharable among tenants.

In certain embodiments, the user systems 612 (which may be client systems) communicate with the application servers 700 to request and update system-level and tenant-level data from the system 616 that may require sending one or more queries to the tenant data storage 622 and/or the system data storage 624. The system 616 (e.g., an application server 700 in the system 616) automatically generates one or more SQL statements (e.g., one or more SQL queries) that are designed to access the desired information. The system data storage 624 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for determining whether to package software artifacts into a manifest comprising:
   creating, by a database system, a router associated with a plurality of delivery queues;
   receiving, by the router, a copy of a software change requested for a production environment associated with at least one data center location;
   sending, by the router, the copy of the software change to a corresponding one of the plurality of delivery queues;
   receiving, by a database system, one or more software artifacts associated with the copy of the software change;
   storing, by the database system, the one or more software artifacts in a memory location of a controlled-access production repository;

monitoring, by the database system, a plurality of different authorization policies of a plurality of developers for approving software artifacts;

determining continuously, by the database system, whether any of the authorization policies have been changed;

receiving, by the database system, a first authorization determination of an approval of the one or more software artifacts from an author-user account, the author user account associated with a developer identity that created source code associated with the one or more software artifacts;

receiving, by the database system, a second authorization determination of an approval of the one or more software artifacts from an additional-user account, associated with an additional developer identity;

determining, by the database system, based on the software change in the corresponding one of the plurality of delivery queues, whether the first and second authorizations are valid in accordance with their respective authorization policies including any changes thereto;

identifying, by the database system, configuration data compatible with the production environment;

packaging, by the database system, the one or more approved software artifacts and the identified configuration data into a manifest in response to a determination that both the first and second authorization determinations represent approvals by the author-user account and the additional-user account of the one or more software artifacts;

transmitting, by the database system, the manifest to the requesting production environment;

retriggering, by the database system, the software change that was sent to the corresponding one of the plurality of delivery queues when it is determined the software change request has been missed and remains in the corresponding one of the plurality of delivery queues; and removing, by the router, the copy of the software change from the corresponding one of the plurality of delivery queues, in response to a determination that a merge of a master branch has been successful in the requesting production environment, wherein the merge was performed based on determining both the first and second authorizations approve the one or more software artifacts.

2. The method of claim 1, further comprises:
receiving, by the database system, an approval submission from the additional-user account, the approval submission including a selection of an approval functionality due to the additional-user account having write access to the production repository and an approval comment associated with the one or more software artifacts due to the additional-user account not having write access to the production repository.

3. The method of claim 2, further comprising:
generating, by the database system, a fail status of the first and second authorization determinations due to at least one of an identification of an error in the one or more software artifacts and a determination that the additional-user account lacks access privileges for generating the approval submission.

4. The method of claim 1, further comprising:
creating, by the database system, a first manifest for delivery to a first data center location requesting the software version change, the first manifest including configuration data compatible with one or more policies of the first data center location requesting the software version change; and creating, by the database system, a second manifest for delivery to a second data center location different than the first data location center requesting the software version change, the second manifest including configuration data compatible with one or more policies of the second data center location.

5. The method of claim 1, further comprising:
accessing, by the database system, a plurality of different authorization policies to be applied to respective software artifacts, stored in the production repository, from one or more teams of user accounts;

changing, by the database system, an authorization policy of a repository folder in which the one or more software artifacts of the author-user account is stored to allow the additional-user account to submit the second authorization determination, the author-user account and the additional-user account belonging to a same development team; and applying, by the database system, the authorization policy change for the additional-user account to the repository folder in response to a repository administrator approval of the authorization policy change.

6. The method of claim 1, further comprising:
based on determining, by the database system, both the first and second authorizations approve the one or more software artifacts prompting, by the database system, the author-user account to merge the one or more software artifacts into a master branch of the controlled-access repository.

7. A computer program product comprising computer-readable program code to be executed by one or more processors when retrieved from a non-transitory computer-readable medium, the program code including instructions to:

create, by a database system, a router associated with a plurality of delivery queues;

receive, by the router, a copy of a software change requested for a production environment associated with at least one data center location;

send by the router, the copy of the software change to a corresponding one of the plurality of delivery queues;

receive, by a database system, one or more software artifacts associated with the copy of the software change;

store, by the database system, the one or more software artifacts in a memory location of a controlled-access production repository;

monitor, by the database system, a plurality of different authorization policies of a plurality of developers for approving software artifacts;

determine continuously, by the database system, whether any of the authorization policies have been changed;

receive, by the database system, a first authorization determination of an approval of the one or more software artifacts from an author-user account, associated with a developer identity that created source code associated with the one or more software artifacts;

receive, by the database system, a second authorization determination of an approval of the one or more software artifacts from an additional-user account, associated with an additional developer identity;

determine, by the database system, based on the software change in the corresponding one of the plurality of delivery queues, whether the first and second authorizations are valid in accordance with their respective authorization policies including any changes thereto;

identify, by the database system, configuration data compatible with the production environment;

package, by the database system, the one or more approved software artifacts and the identified configuration data into a manifest in response to a determination that both the first and second authorization determinations represent as approvals by the author-user account and the additional-user account of the one or more software artifacts;

transmit, by the database system, the manifest to the requesting production environment;

retrigger, by the database system, the software change that was sent to the corresponding one of the plurality of delivery queues when it is determined the software change request has been missed and remains in the corresponding one of the plurality of delivery queues; and remove, by the router, the copy of the software change from the corresponding one of the plurality of delivery queues, in response to a determination that a merge of a master branch has been successful in the requesting production environment, wherein the merge was performed based on determining both the first and second authorizations approve the one or more software artifacts.

8. The computer program product of claim 7, wherein the program code further comprises instructions to:

receive an approval submission from the additional-user account, the approval submission including a selection of an approval functionality due to the additional-user account having write access to the production repository and the approval submission comprises an approval comment associated with the one or more software artifacts due to the additional-user account not having write access to the production repository.

9. The computer program product of claim 8, wherein the program code further comprises instructions to generate a fail status of the first and second authorization determinations due to at least one of an identification of an error in the one or more software artifacts and a determination that the additional-user account lacks access privileges for generating the approval submission.

10. The computer program product of claim 7, wherein the program code further comprises instructions to:

create a first manifest for delivery to a first data center location requesting the software version change, the first manifest including configuration data compatible with one or more policies of the first data center location requesting the software version change; and create a second manifest for delivery to a second data center location different than the first data location center requesting the software version change, the second manifest including configuration data compatible with one or more policies of the second data center location.

11. The computer program product of claim 7, wherein the program code further comprises instructions to:

access a plurality of different authorization policies to be applied to respective software artifacts, stored in the production repository, from one or more teams of user accounts;

change an authorization policy of a repository folder in which the one or more software artifacts of the author-user account is stored to allow the additional-user account to submit the second authorization determination, the author-user account and the additional-user account belonging to a same development team; and applying the authorization policy change for the additional-user account to the repository folder in response to a repository administrator approval of the authorization policy change.

12. The computer program product of claim 7, wherein the program code further comprises instructions to:

based on determining both the first and second authorizations approve the one or more software artifacts prompt the author-user account to merge the one or more software artifacts into a master branch of the controlled-access repository.

13. A system comprising:

one or more processors; and a non-transitory computer readable medium storing a plurality of instructions, which when executed, cause the one or more processors to:

create, by a database system, a router associated with a plurality of delivery queues;

receive, by the router, a copy of a software change requested for a production environment associated with at least one data center location;

send, by the router, the copy of the software change to a corresponding one of the plurality of delivery queues;

receive, by a database system, one or more software artifacts associated with the copy of the software change;

store, by the database system, the one or more software artifacts in a memory location of a controlled-access production repository;

monitor, by the database system, a plurality of different authorization policies of a plurality of developers for approving software artifacts;

determine continuously, by the database system, whether any of the authorization policies have been changed;

receive, by the database system, a first authorization determination of an approval of the one or more software artifacts from an author-user account, associated with a developer identity that created source code associated with the one or more software artifacts;

receive, by the database system, a second authorization determination of an approval of the one or more software artifacts from an additional-user account, associated with an additional developer identity;

determine, by the database system, based on the software change in the corresponding one of the plurality of delivery queues, whether the first and second authorizations are valid in accordance with their respective authorization policies including any changes thereto;

identify, by the database system, configuration data compatible with the production environment;

package, by the database system, the one or more approved software artifacts and the identified configuration data into a manifest in response to a determination that both the first and second authorization determinations represent an approvals by the author-user account and the additional-user account of the one or more software artifacts;

transmit, by the database system, the manifest to the requesting production environment;

retrigger, by the database system, the software change that was sent to the corresponding one of the plurality of delivery queues when it is determined the software change request has been missed and remains in the corresponding one of the plurality of delivery queues; and remove, by the router, the copy of the software change from the corresponding one of the plurality of delivery queues, in response to a determination that a merge of a master branch has been successful in the requesting production environment, wherein the merge was performed based on determining both the first and second authorizations approve the one or more software artifacts.

14. The system of claim 13, wherein the plurality of instructions, when executed, further cause the one or more processors to:
receive an approval submission from the additional-user account, the approval submission including a selection of an approval functionality due to the additional-user account having write access to the production repository and the approval submission comprises an approval comment associated with the one or more software artifacts due to the additional-user account not having write access to the production repository.

15. The system of claim 14, wherein the plurality of instructions, when executed, further cause the one or more processors to generate a fail status of the first and second authorization determinations due to at least one of an identification of an error in the one or more software artifacts and a determination that the additional-user account lacks access privileges for generating the approval submission.

16. The system of claim 13, wherein the plurality of instructions, when executed, further cause the one or more processors to:
create a first manifest for delivery to a first data center location requesting the software version change, the first manifest including configuration data compatible with one or more policies of the first data center location requesting the software version change; and
create a second manifest for delivery to a second data center location different than the first data location center requesting the software version change, the second manifest including configuration data compatible with one or more policies of the second data center location.

17. The system of claim 13, wherein the plurality of instructions, when executed, further cause the one or more processors to:
access a plurality of different authorization policies to be applied to respective software artifacts, stored in the production repository, from one or more teams of user accounts;
change an authorization policy of a repository folder in which the one or more software artifacts of the author-user account is stored to allow the additional-user account to submit the second authorization determination, the author-user account and the additional-user account belonging to a same development team; and
applying the authorization policy change for the additional-user account to the repository folder in response to a repository administrator approval of the authorization policy change.

* * * * *